(12) United States Patent
Bücker et al.

(10) Patent No.: US 8,644,249 B2
(45) Date of Patent: Feb. 4, 2014

(54) TELECOMMUNICATION SYSTEM AND METHOD FOR CONTROLLING SWITCHING OF USER TERMINAL BETWEEN TWO NETWORKS

(75) Inventors: Wolfgang Bücker, Neubiberg (DE); Wolfgang Gröting, Oberhausen (DE); Günther Horn, München (DE); Joachim Kroβ, München (DE); Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1203 days.

(21) Appl. No.: 11/991,839

(22) PCT Filed: Aug. 24, 2006

(86) PCT No.: PCT/EP2006/065632
§ 371 (c)(1),
(2), (4) Date: Mar. 12, 2008

(87) PCT Pub. No.: WO2007/031389
PCT Pub. Date: Mar. 22, 2007

(65) Prior Publication Data
US 2009/0052396 A1 Feb. 26, 2009

(30) Foreign Application Priority Data
Sep. 12, 2005 (DE) .......................... 10 2005 043 364

(51) Int. Cl.
*H04W 4/00* (2009.01)
(52) U.S. Cl.
USPC ........ 370/331; 370/328; 370/338; 455/422.1; 455/436

(58) Field of Classification Search
USPC .......................................................... 370/331
See application file for complete search history.

(56) References Cited

U.S. PATENT DOCUMENTS

| 7,079,499 | B1 * | 7/2006 | Akhtar et al. ................. 370/310 |
| 7,305,429 | B2 * | 12/2007 | Borella ......................... 709/219 |
| 7,380,124 | B1 * | 5/2008 | Mizell et al. .................. 709/218 |
| 7,610,396 | B2 * | 10/2009 | Taglienti et al. .............. 709/223 |

(Continued)

FOREIGN PATENT DOCUMENTS

WO 2004/006447 A2 1/2004

OTHER PUBLICATIONS

A. Salkintzis; "WLAN/3G Interworking Architectures for Next Generation Hybrid Data Networks"; IEEE Communications Soc.; Jun. 2004; pp. 3984-3988.

(Continued)

*Primary Examiner* — Ian N Moore
*Assistant Examiner* — Jenee Alexander
(74) *Attorney, Agent, or Firm* — Staas & Halsey LLP

(57) ABSTRACT

A user terminal is switched between a cellular network and a worldwide interoperability for microwave access radio network within a telecommunication system. An authentication, authorization and accounting (AAA) server which is designed for use with both of these networks is disposed in the telecommunication system in such a way that user data of the user terminal stored in the AAA server can be accessed from both of these networks, thereby advantageously ensuring uninterrupted switching between the two networks free of loss.

7 Claims, 5 Drawing Sheets

(56) References Cited

U.S. PATENT DOCUMENTS

| | | | |
|---|---|---|---|
| 7,710,923 B2* | 5/2010 | Carlton | 370/328 |
| 7,746,873 B2* | 6/2010 | Saito et al. | 370/338 |
| 2003/0067923 A1* | 4/2003 | Ju et al. | 370/395.3 |
| 2004/0013116 A1* | 1/2004 | Greis et al. | 370/392 |
| 2004/0052238 A1* | 3/2004 | Borella et al. | 370/352 |
| 2004/0095924 A1* | 5/2004 | Holur et al. | 370/352 |
| 2004/0114559 A1* | 6/2004 | Wang | 370/338 |
| 2004/0120277 A1* | 6/2004 | Holur et al. | 370/328 |
| 2004/0213260 A1* | 10/2004 | Leung et al. | 370/395.3 |
| 2005/0068929 A1 | 3/2005 | Chang et al. | |
| 2006/0009213 A1* | 1/2006 | Sturniolo et al. | 455/426.1 |
| 2006/0018291 A1* | 1/2006 | Patel et al. | 370/335 |
| 2006/0050659 A1* | 3/2006 | Corson et al. | 370/310 |
| 2006/0072542 A1* | 4/2006 | Sinnreich et al. | 370/351 |
| 2006/0123079 A1* | 6/2006 | Sturniolo et al. | 709/203 |
| 2006/0148479 A1* | 7/2006 | Park et al. | 455/437 |
| 2006/0153120 A1* | 7/2006 | Channasamudhram | 370/328 |
| 2006/0209760 A1* | 9/2006 | Saito et al. | 370/331 |
| 2007/0223410 A1* | 9/2007 | Oyama et al. | 370/310 |

OTHER PUBLICATIONS

M. Cappiello et al.; "Mobility amongst Heterogeneous Networks with AAA Support"; 2002 IEEE Int'l Conf. on Communication, vol. 1 of 5; pp. 2064-2069.

D. Renaudeau; "WiMax: From Fixed Wireless Access to Internet in the Pocket"; Alcatel Telecom Review, 2nd Quarter 2005; 1-8.

C. Perkins, "Mobile IP and Security Issue: An Overview"; Proc. First IEEE; Popov Workshop on Internet Technologies and Services, 1999, pp. 131-148.

3rd Generation Partnership Project; Technical Specification Group Core Network; Numbering, addressing and identification; Release 6; GSM; 3GPP TS 23.003 V6.2.0; Mar. 2004; pp. 1-41.

3rd Generation Partnership Project; Technical Specification Group Core Network; Interworking between the Public Land Mobile Network (PLMN) supporting packet based services and Packet Data networks (PDN); Release 5; GSM; 3GPP TS 29.061 V5.8.0; Dec. 2003; pp. 1-68.

3rd Generation Partnership Project; Technical Specification Group Services and System Aspects; 3GPP system to Wireless Local Area Network (WLAN) interworking; System description; Release 6; 3GPP TS 23.234 V6.5.0; Jun. 2005; pp. 1-79.

3rd Generation Partnership Project; Technical Specification Group Core Network; General Packet Radio Service (GPRS); GPRS Tunneling Protocol (GTP) across the Gn and Gp interface; Release 6; 3GPP TS 29.060 V6.0.0; Mar. 2003; GSM; pp. 1-95.

International Search Report for Application No. PCT/EP2006/065632; mailed Jan. 22, 2007.

Partial Office Action in German Patent Application No. 10 2005 043 364.2.

* cited by examiner

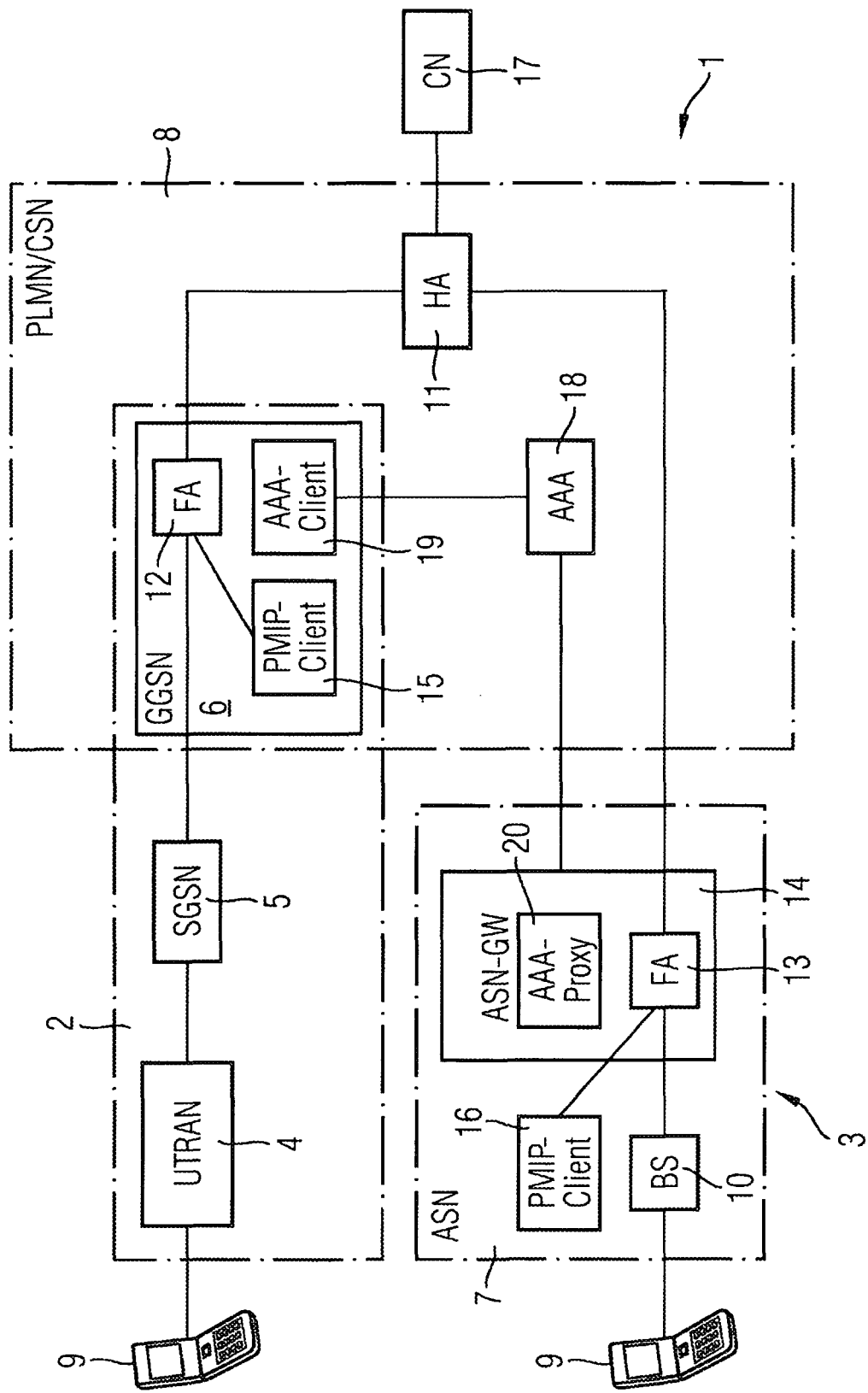

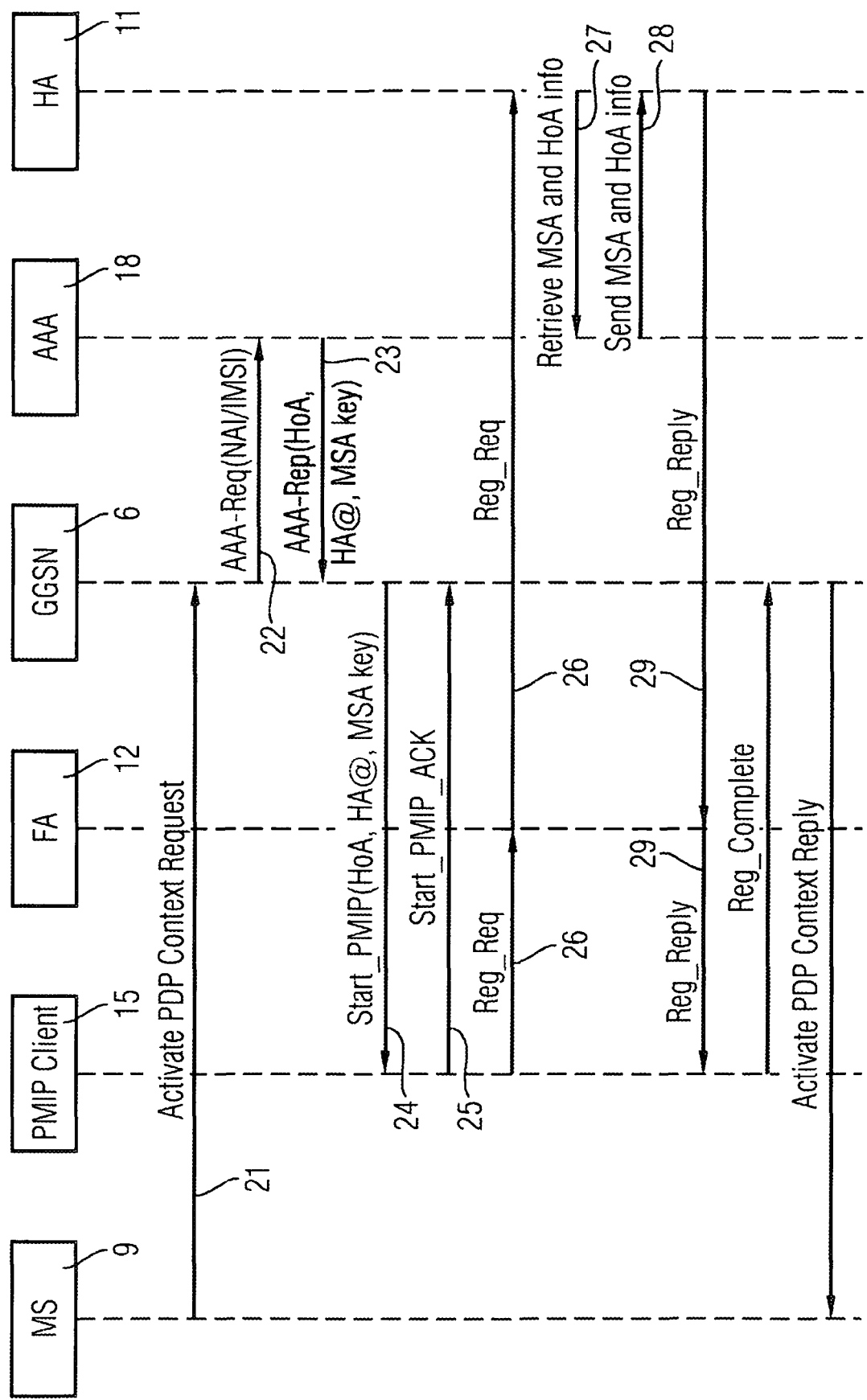

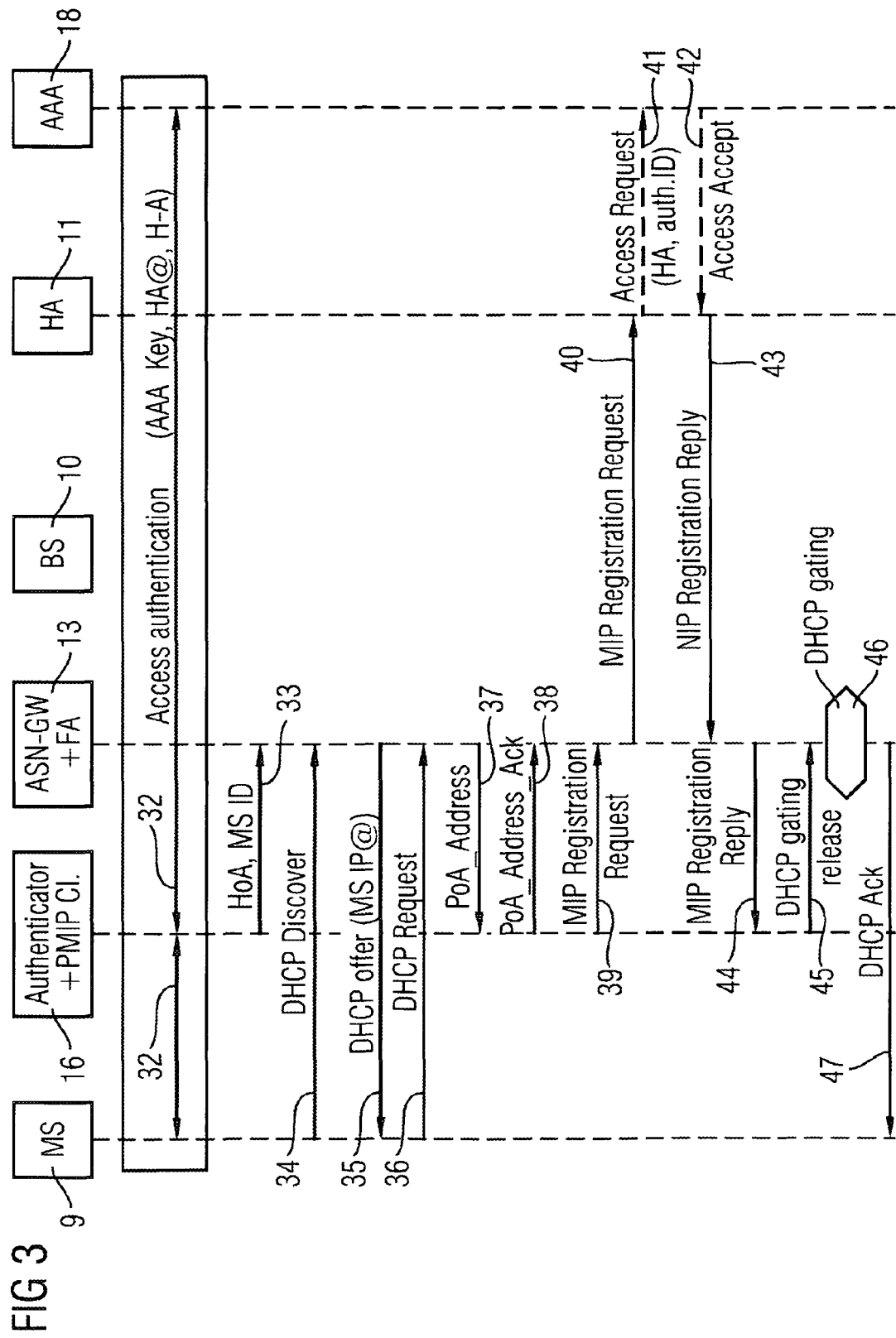

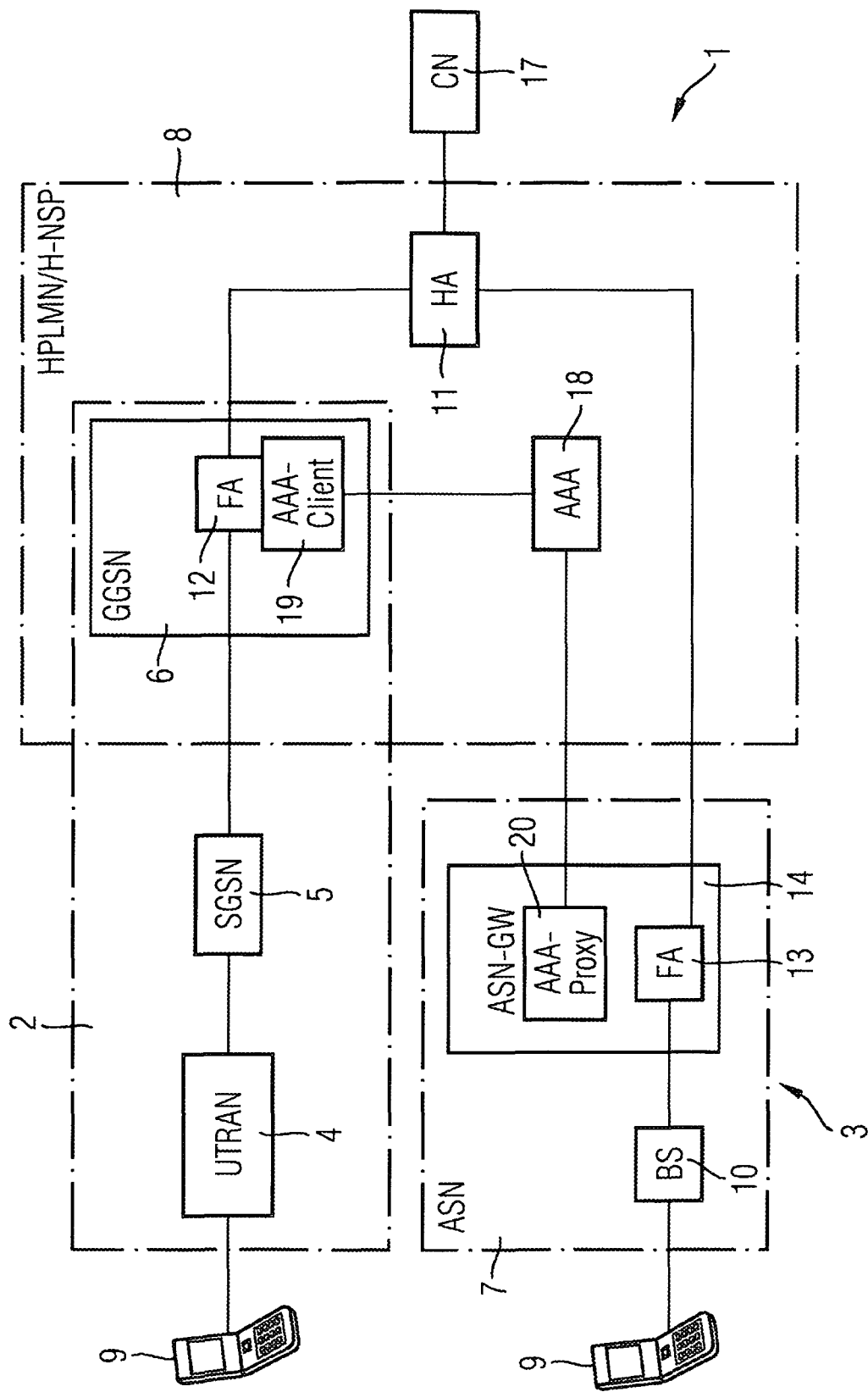

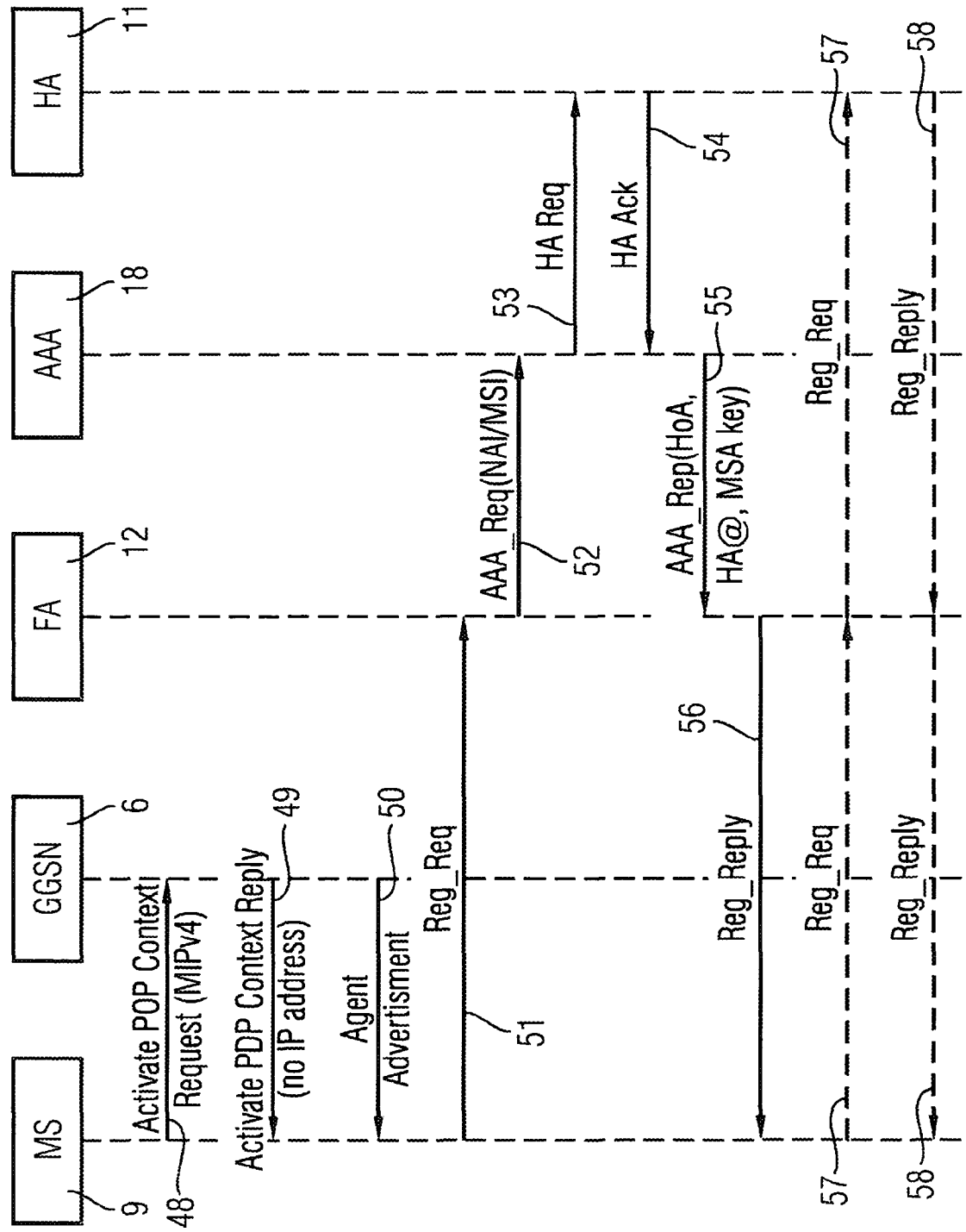

TELECOMMUNICATION SYSTEM AND METHOD FOR CONTROLLING SWITCHING OF USER TERMINAL BETWEEN TWO NETWORKS

CROSS REFERENCE TO RELATED APPLICATIONS

This application is based on and hereby claims priority to German Application No. 10 2005 043 364.2 filed on Sep. 12, 2005, the contents of which are hereby incorporated by reference.

BACKGROUND

Described below is a telecommunication system featuring a first network and a second network, and a method for controlling switching of a user terminal between the first network and the second network.

At present there is on ongoing expansion of cellular mobile radio networks, especially of the 3rd generation, i.e. primarily in accordance with what is known as the Universal Mobile Telecommunications System, UMTS standard. At the same time further radio networks are being developed which are aiming to provide subscribers with greater bandwidths, to enable large volumes of data to be transmitted in a short period. Such a radio network has been planned for some time now by a number of interested parties, who have joined together to form what is known as the WiMAX, Worldwide Interoperability for Microwave Access, Forum (www.wimaxforum.org) in order to create a standard for a WiMAX radio network. The intention is for user terminals, such as mobile telephones or notebooks for example, to have access to both conventional mobile radio networks such as the UMTS network, and also to the WiMAX radio network. This allows users to select the network most suitable for them according to specific criteria, such as availability, price, quality, etc., for example, and to switch as required between two different networks.

Data losses or interrupted connections can occur when switching between two networks, and such problems should be avoided. For this reason such a switch between two different networks is supported by a mobility protocol. The task of the mobility protocol is to maintain existing communication links of a user when switching networks and to avoid interruptions or at least to minimize them in such cases.

Such a mobility protocol has been defined for example by the WiMAX Forum above all on the basis of the so-called Mobile IP protocol, especially of the Mobile IP protocol Version 4, MIPv4, of the Internet Engineering Task Force, IETF. The WiMAX Forum has defined two different variants for using Mobile IP. One defines a Client Mobile IP, CMIP, client which is installed directly in the user terminal and handles the signaling for the switch between the two networks via the user terminal. Another defines a so-called Proxy Mobile IP, PMIP, client, which is installed in the network and represents a proxy for the user terminal in the network in respect of the switch between the networks. The PMIP handles the signaling for switching between the networks for the user terminal. In this case the user terminal is largely unaware that the mobility protocol is being used in the network.

SUMMARY

An aspect is to guarantee a largely problem-free switch between a cellular mobile radio network and a so-called WiMAX radio network.

On the device side the telecommunication system contains a first network which is a cellular mobile radio network, a second network which is a so called WiMAX, Worldwide Interoperability for Microwave Access, radio network and a so-called AAA, Authentication, Authorization and Accounting server for storing user data of a user terminal. The user terminal is embodied both to use the first network and also to use the second network. The AAA server is arranged in the telecommunication system so that user data of the user terminal stored in the AAA server is accessible both on the first network side and also on the second network side.

The method involves controlling switching of a user terminal between a first network, which is a cellular mobile radio network, and a second network, which is a so-called WiMAX, Worldwide Interoperability for Microwave Access, radio network. During this process user data of the user terminal, for which access to both the first network and also to the second network is possible, is stored in a so-called AAA, Authentication, Authorization and Accounting server. Access to the user data of the user terminal stored in the AAA server is possible from both the first network side and also from the second network side.

The method thus advantageously enables a seamless transition between the cellular mobile radio network and the WiMAX radio network, so that an interruption to an existing connection can be prevented entirely or almost entirely. This guarantees an especially high efficiency and a high quality when switching between networks. Furthermore an AAA infrastructure network which is common to the two networks can be employed in a simple manner to make the switch. The AAA server already defined in connection with WiMAX can advantageously be embodied so as to allow access to both networks.

In accordance with a further development, the telecommunication system is embodied so that, when a connection is established between the user terminal and the first network or the second network, a check is performed as to whether the user terminal is already connected to the other network. If it is, the user data of the user terminal is retrieved from the AAA server. In a technically simple manner user data about the connection on the other network already present in the AAA server can be used to establish a connection via one of the two networks. This simplifies the signaling when switching between the two networks. Over and above this it is guaranteed that the user data needed to establish the new connection is at least partly the same as that already used to establish the existing connection. This contributes to switching smoothly between the networks.

Especially preferably the telecommunication system is embodied so as to store in the AAA server user data created when the connection is established, if the user terminal is not already connected to the other respective network. In this case the user data stored in the AAA server when the new connection is established can be used for a subsequent switch to the other of the networks. To this end the user data already stored in the AAA server during the switch can be accessed and an uninterrupted switchover can be performed.

In a further embodiment, a mobility protocol is implemented for the switchover of the user terminal between the first network and the second network. This mobility protocol supports a secure switchover and guarantees that the components of the telecommunication system involved in signaling the switchover can complete it. The mobility protocol is especially the so-called Mobile IP mobility protocol. The user terminal can thus retain its IP address when switching to another network.

Especially advantageously a mobile client for the user terminal is defined in the mobility protocol which is equipped for signaling by the user terminal when the user terminal is being switched between the networks. This enables an appropriately equipped user terminal to undertake the signaling autonomously. This simplifies the signaling and keeps the outlay for it low. The mobile client is especially a so-called Client Mobile IP, CMIP, client of the Mobile IP mobility protocol.

In accordance with a further development, a proxy mobile client is defined in the mobility protocol, which is embodied as a proxy for the user terminal for execution of signaling when switching the user terminal between the networks. This means that a user terminal not equipped with a suitable mobile client can also switch networks without problems. The proxy mobile client is especially a so-called Proxy Mobile IP, PMIP, client of the Mobile IP mobility protocol.

Advantageously such a proxy mobile client is implemented in the first network. The cellular mobile radio network is adapted for signaling by a proxy for the user terminal based on the mobility protocol. The cellular mobile radio network can thus make the switch in an especially simple way and advantageously access the AAA server and this in turn can also transfer data to the cellular mobile radio network.

In accordance with a further development, a so-called home agent, HA, for a home network assigned to the user terminal and a so-called foreign agent FA, for a foreign network able to be used by the user terminal which is not its home network, are defined in the mobility protocol. The foreign agent, FA, is embodied in this case so that it receives signaling and payload data coming from the home network of the user terminal directed to the user terminal. The home agent, HA, can especially be a specific computer or router, which is connected to the home network of the user terminal. The home agent above all forwards data packets arriving for the user terminal in the home network to the user terminal, provided this terminal is not located in the home network. The home agent further administers the location information of the user terminal. The foreign agent, FA, can likewise be a specific computer or router which is connected to the foreign network which is not the home network of the user terminal. For the user terminal located in the area of the foreign network the foreign agent makes available routing services to the foreign network. In particular the foreign agent forwards to the user terminal the data packets transferred by the home agent of the user terminal. The terms home network and foreign network are used here in the sense of the terminology relevant to the mobility protocol.

Especially preferably such a foreign agent, FA is present in the first network, which is embodied so as to forward mobility-protocol-specific signaling data between the proxy mobile client and the home agent, while forwarding actual user payload data between the user terminal and the home agent. An effective forwarding of data from and to the user terminal is possible in this technically simple manner.

In accordance with a further development, the user data stored in the AAA server contains at least one item, especially all items of the following information: —Information needed for a so-called Mobile Security Association, MSA, for protecting transmission of mobility-protocol-specific signaling data between the user terminal and the home agent, such as for example a common privacy key for creating a so-called Message Authentication Code, MAC, specification of an algorithm for creating the Message Authentication Code MAC, a copy protection, etc.,—An address of the home agent of the user terminal and—a home address of the user terminal in its home network. with one or more items, especially all items of this information a smooth transition between the two networks can be effectively guaranteed.

Especially preferably the telecommunication system is embodied so that, when a switch is made of the user terminal between the first network and the second network a connection of the user terminal to one of the two networks which existed before the switch is maintained, especially for a predeterminable duration, after the new connection of the user terminal to the other of the two networks has been established. This enables it to be advantageously guaranteed that the newly established connection has been proven and functions before the "old" connection, which already existed before the new connection was set up, is cleared down. Where necessary it is also easily possible to obtain renewed access to the "old" connection and thereby to have a fallback position.

In accordance with a further development, the first network is a network according to the so-called Universal Mobile Telecommunications System, UMTS, standard. The combination of UMTS network and WiMAX network gives the user an especially large freedom of movement and comfort.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a block diagram of a first exemplary embodiment of a telecommunication system with a UMTS network and a WiMAX network, each featuring a Proxy Mobile IP client of a mobility protocol;

FIG. 2 is a first timing sequence diagram of the signaling on establishment of a connection from a user terminal in the UMTS network of the telecommunication system depicted in FIG. 1;

FIG. 3 is a second timing sequence diagram of the signaling on establishment of a connection from the user terminal in the WiMAX network of the telecommunication system depicted in FIG. 1;

FIG. 4 is a block diagram of a second exemplary embodiment of the telecommunication system with the UMTS and the WiMAX network, with the user terminal featuring a Client Mobile IP client of the mobility protocol, and FIG. 5 is a third timing sequence diagram of the signaling on establishment of a connection from the user terminal in the UMTS network of the telecommunication system depicted in FIG. 4;

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In the figures of the drawing the same elements and signals or those with the same function—unless otherwise specified—have been provided with the same reference symbols.

FIG. 1 shows a first exemplary embodiment of a telecommunication systems 1 with a first network, which here is a UMTS network 2, and a second network which is a WiMAX network 3. The UMTS network 2 has a so-called UMTS Terrestrial Radio Access Network, UTRAN, 4, which serves as an access network of the UMTS network 2. The UMTS network 2 further contains a so-called Serving GPRS Support Node, SGSN, 5, which represents a higher control unit of the UMTS network 2 and is connected to a specific network node, the so-called Gateway GPRS Support Node, GGSN, 6. The WiMAX network 3 largely corresponds to the structure specified by the WiMAX Forum. The WiMAX network 3 contains a so-called Access Service Network, ASN, 7 and in addition a so-called Connectivity Service Network, CSN. The CSN of the WiMAX network 3 in the present exemplary embodiment, to simplify the diagram, is combined with the so-called Public Land Mobile Network, PLMN, of the UMTS network 2 into a common network PLMN/CSN 8. The PLMN and the CSN can however also be separate networks. It is especially possible for both the UMTS network 2 as also the WiMAX network 3 to have the same network operator.

The telecommunication system 1 also contains a mobile station 9, which represents a user terminal and in this case is a mobile telephone. The mobile station 9 has both an access to the UMTS network 2 and also to the WiMAX network 3 and can switch between the two networks. To illustrate this point, the mobile station 9 is shown twice in FIG. 1. On the one hand it is connected to the UTRAN 4 of the UMTS network 2 and on the other to a base station BS 10 of the WiMAX network 3 arranged in the ASN 7. For switching between the two networks a mobility protocol is implemented in the telecommunication system 1 which supports the switch from one of the networks to the other. The mobility protocol here is the so-called Mobile IP, MIP, protocol. The MIP defines a home agent, HA, to which the mobile station 9 is assigned. In the present exemplary embodiment a home agent HA 11 is arranged in the common network 8. The MIP also defines a foreign agent, FA. In the present case a first foreign agent FA 12 is arranged in the GGSN 6 of the UMTS network 2. A second foreign agent FA 13 is present in a gateway ASN-GW 14 of the ASN 7 of the WiMAX network 3. The home agent HA 11 is connected to both the foreign agent FA 12 and also to the foreign agent FA 13. The foreign agent FA 12 is additionally connected to the SGSN 5 and the foreign agent FA 13 is connected to the base station 10.

In the use of the mobility protocol defined by the WiMAX Forum a proxy mobile client is likewise defined which is designed for signaling when the switch is made by the mobile station 9 between the two networks 2 and 3. The proxy mobile client here is a Proxy Mobile IP, PMIP, client of the mobility protocol. The PMIP serves as a proxy for the mobile station 9, so that this does not have to have the mobility protocol installed here. A first PMIP client 15 is present in the UMTS network 2. In the present exemplary embodiment the PMIP client 15 is arranged in the GGSN 6. This is not necessarily the case however. The PMIP client 15 can also be arranged separately from the GGSN 6 in the UMTS network 2. In FIG. 1 the PMIP client 15 is connected to the foreign agent FA 12. A second PMIP client 16 is present for the WiMAX network 3 in the ASN 7. The PMIP client 16 is connected in FIG. 1 to the foreign agent FA 13. The home agent HA 11 is also used as the gateway to further areas of the telecommunication system 1. To represent this a so-called correspondent node, CN, 17 is shown in FIG. 1 which can be a Web server in the Internet for example.

Arranged in the common network PLMN/CSN 8 is a so-called Authentication, Authorization and Accounting, AAA server 18. This AAA server 18 above all supports the authentication, authorization and accounting for the WiMAX network 3 as well as the accounting of transmission of communication data or messages. For communication with the AAA server 18 an AAA client 19 is present in the UMTS network 2 in the GGSN 6 and an AAA proxy 20 is present in the WiMAX network 3 in the ASN-GW 14. The AAA server 18 here is connected to both the UMTS network 2, and in this network to the AAA client 19, and also to the WiMAX network and in this network to the AAA proxy 20. Inventively there can be access from both the UMTS network 2 and also from the WiMAX network 3 to the AAA server 18. Accordingly data can be transmitted from the AAA server 18 data to the two networks 2 and 3.

The data that can above all be stored and administered in the AAA server 18 is data such as that assigned to the mobile station 9 and required for switching the mobile station 2 from the UMTS network 2 to the WiMAX network or vice versa to enable the necessary MIP operations and signaling to be conducted. The information required for establishing a "new" connection largely corresponds to that required for an "old" connection to that network, to which a connection already exists. Viewed from the standpoint of the home agent HA 11, the switch to the other network is concealed behind a simple switch of so-called care-of address, CoA. This CoA corresponds to the address of the mobile station 9 in one of the foreign networks, i.e. that address under which the mobile station can be reached when it is located in the foreign network. Such a switch of the CoA can be undertaken in the signaling by a so-called Registration Request. The information stored for the mobile station 9 in the AAA server 18, to which there can be access in the event of a switch between networks, is in this case especially: —Information, MSA data, needed for a so-called Mobile Security Association, MSA, for protecting transmission of mobility-protocol-specific signaling data between the mobile station 9 and the home agent 11, such as a common privacy key for example for creating a so-called Message Authentication Code, MAC, specification of an algorithm for creating the MAC, a copy protection, etc., —An address HA@ of the home agent 11 of the mobile station 9 and—a home address HoA of the mobile station 9 in its home network 8 (in the WiMAX Standard this home address is referred to as the Point of Attachment, PoA). This information is created when the mobile station 9 first dials into one of the two networks 2 or 3 and is stored in a specific area of the AAA server 18. In the event of a switch between networks 2 or 3 the information can then be interrogated and retrieved. The information is then transferred to the PMIP client of the "new" network 2 or 3 so that this can perform the necessary MIP operations and signaling for executing the switch. When the switch is made the MSA data, the HA@ and the HoA remains the same here and only the CoA switches.

FIG. 2 shows a first flow diagram, in which the timing of the signalling sequence for establishing a connection between the mobile station 9 in the UMTS network 2 of the telecommunication system 1 according to FIG. 1 is depicted. At the start the mobile station 9 authenticates itself via the SGSN 5 and a so-called Home Location Register, HLR, by a so-called Authentication and Key Agreement, AKA, in a conventional GPRS/UMTS PS procedure. The SGSN 5 then receives the user profile of the mobile station 9 from the HLR. This access to the UMTS network 2 via the SGSN 5 is not of any significance for the invention here and is thus not further described and is not shown in FIG. 2. The following description of a so-called Packet Data Protocol, PDP, context creation procedure with reference to FIG. 2 then applies both to the case in which the mobile station 9 establishes a "new" connection to the UMTS network 2, without already having been connected to the WiMAX network 3 beforehand, and also to the case in which the mobile station 9 establishes a "new" connection to the UMTS network 2 while already being connected to the WiMAX network 3.

FIG. 2 shows different components of the telecommunication system 1 involved in the signaling. In a first step 21 the mobile station 9 sends a so-called PDP Context Activation Request via the SGSN 5 to the GGSN 6. In this case a radio access point, a so-called Access Point Name, APN is advantageously selected at the GGSN 6, which supports roaming between the WiMAX network 3 and the UMTS network 2. For this purpose, such an APN must for example must provide a PMIP functionality and it must further be possible to reach both the home agent HA 11 by MIP signaling for a data transport and also the AAA server 18 via the AAA Infrastructure via it. Alternatively it is also possible, in the user profile assigned to the mobile station 9, that only this specific APN with the PMIP functionality may be selected for the mobile station 9, and thus other APNs are not available for the switch.

After the GGSN 6 has received the PDP Context Activation Request, in a step 22 it sends a so-called AAA Request to the AAA server 18. This is made via the AAA client 19, which is arranged in the GGSN 6. The AAA Request can contain a so-called Network Access Identifier, NAI, which can especially be supplied by the mobile station 9 together with a password in order to make available an additional safety measure for access to services of the APN. The AAA Request can further contain a so-called International Mobile Subscriber Identity, IMSI, as an identifier for the mobile station 9 in the UMTS network 2 and/or a canonical NAI which represents an identification for the user data in the AAA server 18. Such an NAI is described in particular in the Specification 3GPP TS 29.061: "3rd Generation Partnership Project; Technical Specification Group Core Network and Terminals; Interworking between the Public Land Mobile Network (PLMN) supporting packet based services and Packet Data Networks (PDN); Release 6"; Section 16. The derivation of a canonic NAI from the IMSI is in particular described in the Specification 3GPP TS 23.003: "3rd Generation Partnership Project; Technical Specification Group Core Network and Terminals; Numbering, addressing and identification; Release 6". For further information the reader is thus referred to these specifications. On the basis of the information transferred in step 22 the AAA server 18 must be able to access the appropriate user data stored in it.

In a further step 23 the AAA server 18 replies to the GGSN 6 by a so-called AAA Reply and transmits the following parameters or information: —An IP address, which serves at the home address HoA of the mobile station 9 in the MIP (this address is also referred to as the PoA in accordance with the WiMAX Standard), —an address HA@ of the home agent HA 11, and—further data which is required to protect the communication between the PMIP client 15 which assumes the role of the mobile station 9 here as a proxy for the signaling, and to protect the home agent HA 11 by an MSA. Optionally an address of the original ASN-GW 14 can be transferred as well. If such an address of the ASN-GW 14 is transferred and received by the GGSN 6, the GGSN 6 can optionally set up a so-called R4 tunnel to the ASN-GW 14. The information described here, provided an "old" connection to the WiMAX network 3 exists beforehand, can already have been stored because of this "old" connection in the AAA server 18. If this "old" connection does not exist, this information is first created and then stored in the AAA server 18.

In a next step 24 the GGSN 6 triggers the PMIP client 15 by a so-called Start PMIP command. This begins the MIP registration and the MIP-specific information, especially that received from the AAA server 18, is forwarded from the GGSN 6 to the PMIP client 15. The PMIP client 15 can then acknowledge the receipt of this information in a step 25 by a Start PMIP 11 ACK message to the GGSN 6.

In a subsequent step 26 the PMIP client 15 sends a so-called MIP Registration Request to the home agent 11. When this is done the address of the foreign agent 12 is used as the CoA address and the HoA of the mobile station 9 which was supplied by the GGSN 6 is used. Advantageously it is possible to maintain, the "old" MIP relationship between the home agent 11 and the foreign agent 13 of the WiMAX networks 3. This can for example be undertaken by a specific flag in the signaling of the PMIP client 15 which is set for this purpose. In this case the home agent directs data packets to both foreign agents, the "new" foreign agent 12 and the "old" foreign agent 13. This means that an even more improved seamless transition between the two networks 2 and 3 is able to be guaranteed, with an uninterrupted connection to the mobile station 9. This parallel connection to both networks 2 and 3 can especially be maintained for a specific predeterminable period, which can be suitably selected until it is ensured that the "new" connection to the UMTS network 2 is fulfilling its function safely and stably. If the mobile station 9 aborts the connection to the WiMAX network 3, the PMIP client 16 of the WiMAX network 3 deregisters its bindings. The result of this is than that the MIP forwarding tunnel is then cleared down. Alternatively it is possible for the PMIP client 16 to clear down the MIP forwarding tunnel if it receives a message that the mobile station 9 is using the UMTS network 2 without aborting the connection to the WiMAX network 3. In this case the PMIP client 16 can set up the MIP forwarding tunnel again in a simple manner if the PMIP client 16 receives a message that the mobile station 9 would like to communicate via the WiMAX network 3 once again. This avoids a waste of resources by transmitting data via two connections, if it is also sufficient to transmit the data via only one.

If the mobile station 9 is not yet connected to the WiMAX network 3 beforehand, in a next step 27 the home agent 11 contacts the AAA server 18, to interrogate the MSA data and the address HoA. With this information the MSA can then be established between the PMIP client 15 and the home agent HA 11. In a subsequent step 28 the data of the AAA server 18 is transmitted to the home agent HA 11. With this embodiment variant the home agent HA 11 requests the data of the AAA server 18. It is also possible for the AAA server 18 to have already transmitted the required information to the home agent 11 after step 22. The steps 27 and 28 are not necessary here, provided the mobile station 9 is already connected beforehand to the WiMAX network 3. In this case the information is already known to the home agent HA 11.

In a step 29 the home agent HA 11 sends a so-called MIP Registration Reply, Reg Reply, message to the PMIP client 15. This transmission of the message is undertaken via the foreign agent 12. Subsequently the PMIP client 15 responds in a step 30 with a Reg Complete message, to notify the successful MIP registration to the GGSN 6. In a subsequent step 31 the GGSN 6 assigns the received address HoA to the mobile station 9 with an Activate PDP Context Reply message and completes the setup of the PDP context.

The mobile station 9 can now begin to send and to receive data packets via the GGSN 6 of the UMTS network 2. On receipt of payload data for the mobile station 9 this is forwarded from the foreign agent 12 to the mobile station 9 while the signaling, as described above, is handled via the PMIP client 15. If an R4 tunnel to the "old" ASN-GW 14 has been set up beforehand, this can be cleared down if the GGSN 6 recognizes the receipt of data from the home agent 11 for the mobile station 9.

FIG. 3 shows a second flowchart in which the timing of the signaling sequences for setting up a connection of the mobile station 9 in the WiMAX network 3 of the telecommunication system 1 according to FIG. 1 is illustrated In this flowchart a switch is made out of the UMTS network 2 to the WiMAX network 3. The WiMAX procedures remain essentially unchanged compared to the WiMAX standard. However MIP user data of mobile station 9 which was created during the previous setup of the "old" connection in the UMTS network 2 is stored here in the AAA server 18. The user data can be made available by the AAA server for signaling when the switch is made to the WiMAX network 3. In the event of the mobile station 9 setting up a connection to the WiMAX network 3 for the first time without a connection previously existing to the UMTS network 2, new MIP user data is created by the AAA server 18, as is defined in the conventional WiMAX procedure, and this MIP user data is then stored in the AAA server, to enable it to be called up in a subsequent switch between networks.

First of all, in a step 32, an access authentication for the mobile station 9 to the WiMAX network 3 is handled by the AAA server 18. In this case the MSA data and other MIP data of the AAA server 18 are transmitted to a so-called authenticator. This authenticator is located in the ASN 7. It is possible above all to use the authenticator to define whether the mobile station 9 may use the WiMAX network 3 or not. In particular the PMIP client 16 is arranged on the authenticator. In FIG. 3 the authenticator and the PMIP client 16 are combined into one common component. Thus, in step 32, especially an AAA key for creation of the Message Authentication Code, MAC, The address HA@ and the IP address HoA of the mobile station 9 are transmitted to the authenticator. In a subsequent step 33 especially an ID of the mobile station 9 and the IP address, HoA or PoA, of the mobile station 9 are then forwarded to the ASN-GW 14. The ASN-GW 14 and the foreign agent 13 fulfill different functions but, for the sake of simplicity, are combined into a common component in FIG. 3.

In steps 34, 35 and 36 the mobile station 9 requests its IP address from the ASN-GW 14. The ASN-GW 14 in this case plays the role of a so-called Dynamic Host Reconfiguration Protocol, DHCP, server. The execution sequence corresponds to the conventional WiMAX procedure via a DHCP Discover message from mobile station 9 to the ASN-GW 14 in step 34, a subsequent DHCP open message of the ASN-GW 14 to the mobile station 9 in step 35 and a DHCP Request message from the mobile station 9 to the ASN-GW 14 in step 36.

In a step 37 the IP address of the mobile station 9 previously already transmitted to the authenticator is transmitted by a PoA Address message from the ASN-GW 14 to the PMIP client 16. The receipt of the IP address HoA or PoA is acknowledged by the PMIP client 16 with a PoA Address Ack message in a step 38.

The receipt of the PoA Address message by the PMIP client 16 likewise initiates the MIP procedure. This is performed in subsequent steps 39-44. In step 39 the MIP registration procedure is started by an MIP Registration Request message. Steps 39-44 largely correspond to steps 26-29 which were described in conjunction with FIG. 2. However the "old" foreign agent here is foreign agent 12 and the "new" foreign agent foreign agent 13. The "old" MIP relationship is accordingly the relationship between the home agent 11 and the foreign agent 12 of the UMTS network 2 and the "new" MIP relationship is that between the home agent 11 and the foreign agent 13 of the WiMAX network 3. No further description of this state of affairs will be provided here.

The release of the IP address HoA, PoA of the mobile station 9 to the mobile station 9 has been delayed by the previous steps, especially for the MIP registration procedure. The release of the IP address HoA, PoA is now initiated in steps 45 and 46 by DHCP gating release messages and DHCP gating messages. In a step 47 the ASN-GW 14 sends a DHCP Ack message to the mobile station 9, so that this can then begin the transmission of data packets.

In the course of the execution procedure shown in FIG. 3 it is also possible to receive the address of the foreign agent 12 as the "old ASN-GW". This shows that the mobile station 9 is currently registered in the UMTS network 2. This enables the "new" ASN-GW 7 to establish a so-called R4 Tunnel to the GGSN 6 in order to prevent a loss of data during the network switchover. This R4 forwarding tunnel can then be cleared down again as soon as it is no longer needed.

FIG. 4 shows a second exemplary embodiment of the inventive telecommunication system 1 with the UMTS network 2 and the WiMAX network 3. By contrast with the first exemplary embodiment as depicted in FIG. 1 the two networks 2 and 3 do not contain any PMIP clients here, which as proxies for the mobile station 9 undertake the signaling for switchover of the network. In the present exemplary embodiment the functionality for executing the mobility protocol Mobile IP, MIP, is relocated directly into the mobile station 9. This has an MIP client for this purpose. The telecommunication system 1 according to FIG. 4, except for the two PMIP clients 12 and 13, thus has the same components as the telecommunication system 1 in accordance with FIG. 1.

An execution sequence will now be described below with reference to FIG. 5 in which the mobile station 9 establishes a connection to the UMTS network 2. This can be undertaken both by switching from the WiMAX network 3 to the UMTS network 2 and also from the situation in which the mobile station 9 has previously not yet been connected to the WiMAX network 3. In a step 48 the mobile station 9 establishes a so-called PDP Context with the UMTS network 2. To this end an Activate PDP Context Request message is transmitted to the GGSN 6 by the mobile station 9. If the mobile station 9 already knows here that it may switch (back) later to the WiMAX network 3, it is advantageous to use an APN which supports MIP and the switch to the WiMAX network 3. An Activate PDP Context Reply message will then be transmitted to the mobile station 9 in a step 49 by the GGSN 6. The PDP Context is established by this, with the mobile station 9 not being assigned any IP address here. This occurs at a later point in time, during the MIP registration procedure. This is a known method of operation, as is described for example in Specifications 3GPP TS 29.061: "3rd Generation Partnership Project; Technical Specification Group Core Network and Terminals; Interworking between the Public Land Mobile Network (PLMN) supporting packet based services and Packet Data Networks (PDN); Release 6", and 3GPP TS 29.060: "3rd Generation Partnership Project; Technical Specification Group Services and System Aspects; General Packet Radio Service (GPRS); Service description; Stage 2; Release 6". In a next step 50 the foreign agent 12 begins to transmit so-called Agent Advertisements to the mobile station 9. Through this the mobile station 9 receives a CoA and begins the MIP registration procedure.

In subsequent steps 51-56 an MIP registration procedure is executed for the case in which the mobile station 9 was previously not connected to the WiMAX network 3. It is then probable that no information, especially MSA data and other MIP data such as the address HA@ and HoA is available to the mobile station 9 to execute the MIP registration. The AAA Infrastructure provided, especially the AAA server 18, can thus be used to create this information. After the receipt of the Reg Reply message in step 56 by the mobile station 9 all the necessary information is available to it so that it can start to transmit and receive data.

In the event of the mobile station 9 already being connected to the WiMAX network 3 previously and a switch from the WiMAX network 3 to the UMTS network 2 being executed, steps 51-56 are not executed. Instead, after step 50 there is a step 57 in which a Reg Req message is transmitted by the mobile station 9 via the foreign agent 12 to the home agent 11 in order to execute the MIP registration procedure. Subsequently a Reg Reply message is sent by the home agent 11 via the foreign agent 12 to the mobile station 9, after the receipt of which the mobile station 9 can then begin to transmit and receive data. In this case it is not necessary to involve the AAA Infrastructure in the MIP procedure, since the mobile station, through its connection to the WiMAX network 3, already contains all the MIP information necessary for making the switch.

In the case in which the mobile station 9 would like to establish a connection to the WiMAX network 3, this procedure for establishing this connections essentially undertaken in accordance with the execution sequence already described above in connection with FIG. 3. However here the mobile station 9 appears here directly instead of the PMIP client 13. First the mobile station 9 executes a WiMAX access authentication. If the mobile station 9 has previously not been connected to the UMTS network 2 the AAA server 18 sends new MIP information, such as MSA data, the addresses HA@ and HoA, to the mobile station 9. If the mobile station 9 has previously already been connected to the UMTS network 2 connected, the AAA server 18 establishes this and suppresses the transmission of the MIP information to the mobile station since it is already present there. Alternatively the AAA server 18 can however still transmit the MIP data for the sake of simplicity. The mobile station 9 can then execute a normal MIP registration procedure.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

Although the present invention has been described here with reference to an exemplary embodiment, it is not restricted to this embodiment, but can be modified in any one of a number of ways within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A telecommunication system operating with a first network which is a cellular mobile radio network and a second network which is a Worldwide Interoperability for Microwave Access radio network, and communicating with at least one user terminal equipped to use both the first network and the second network, said telecommunication system comprising:
an authentication, authorization and accounting (AAA) server that:
stores user data of a user terminal,
makes the user data accessible to both the first network and the second network, and
assists in a switchover of the user terminal between the first and second networks by a mobility protocol that defines a mobile client to handle switchover signaling and a proxy mobile client to handle the switchover signaling,
wherein the mobile client is equipped for switchover signaling by a first user terminal capable of performing the switchover signaling on execution of a switchover of the first user terminal between the first and second networks, and
wherein the proxy mobile client is implemented in the first cellular mobile radio network as a proxy for a second user terminal not capable of performing switchover signaling to execute switchover signaling when switching the second user terminal between the first and the second networks,
when a connection is established between the first or the second user terminal and one of the first and second networks, if determined that the first or the second user terminal is already connected to other one of the first and second networks, the user data is retrieved by said authentication, authorization and accounting server, and if the first or second user terminal is not already connected to the other one of the first and second networks, user data created when the connection is established is stored in said authentication, authorization and accounting server.

2. The telecommunication system as claimed in claim 1, wherein a home agent for a home network assigned to the first or second user terminal and a foreign agent for a foreign network able to be used by the first or second user terminal which is not its home network are defined in the mobility protocol, with the foreign agent being embodied so that it receives signaling and payload data coming from the home network of the first or second user terminal.

3. The telecommunication system as claimed in claim 2, wherein the foreign agent forwards mobility-protocol-specific signaling data between the proxy mobile client and the home agent and forwards actual user payload data between the first or second user terminal and the home agent.

4. The telecommunication system as claimed in claim 1, wherein the user data in said authentication, authorization and accounting server contains one or more of information needed for a Mobile Security association for protecting a transmission of mobility-protocol-specific signaling data between the first or second user terminal and a home agent, a common privacy key to create a Message Authentication Code, information about an algorithm to create the Message Authentication Code, copy protection information, an address of a home agent of the first or second user terminal or a home address of the first or second user terminal in its home network.

5. The telecommunication system as claimed in claim 1, wherein when switching of the first or second user terminal between the first and second networks, a connection of the first or second user terminal to one of the first and second networks which existed before the switching is maintained for a predeterminable duration, after a new connection of the first or second user terminal to the other of the first and second networks has been established.

6. The telecommunication system as claimed in claim 1, wherein the first network is a network in accordance with the Universal Mobile Telecommunications System standard.

7. A method for controlling switching of a user terminal between a first network, which is a cellular mobile radio network, and a second network, which is a Worldwide Interoperability for Microwave Access radio network, comprising:
storing user data of the user terminal in an authentication, authorization and accounting (AAA) server;
providing access to the user data stored in the AAA server to both the first network and the second network;

assisting via the AAA server in a switchover of the user terminal between the first and second networks by a mobility protocol;

defining within a mobility protocol a mobile client to handle switchover signaling and a proxy mobile client to handle the switchover signaling, the mobile client equipped for switchover signaling by a first user terminal capable of performing the switchover signaling on execution of a switchover of the first user terminal between the first and second networks, and the proxy mobile client implemented in the first cellular mobile radio network as a proxy for a second user terminal not capable of performing switchover signaling to execute switchover signaling when switching the second user terminal between the first and second networks; and retrieving the user data by said authentication, authorization and accounting server, when a connection is established between the first or the second user terminal and one of the first and second networks and determined that the first or the second user terminal is already connected to other one of the first and second networks, and storing user data created when the connection is established in said authentication, authorization and accounting server, if the first or second user terminal is not already connected to the other one of the first and second networks.

* * * * *